United States Patent [19]
Hsieh

[11] Patent Number: 5,912,793
[45] Date of Patent: Jun. 15, 1999

[54] DEVICE AND METHOD FOR PROTECTING A CPU FROM BEING DAMAGED BY OVERRATING VOLTAGE OR OVERRATING CURRENT

[75] Inventor: Wen-Chang Hsieh, Chang Hua Hsien, Taiwan

[73] Assignee: Micro-Star International Co., Ltd.

[21] Appl. No.: 08/980,599

[22] Filed: Dec. 1, 1997

[51] Int. Cl.$^6$ .................................................. H02H 3/18
[52] U.S. Cl. ................................. 361/79; 361/91; 361/93
[58] Field of Search .................................. 361/79, 91, 93, 361/18; 323/276

[56] References Cited

U.S. PATENT DOCUMENTS

| | | | |
|---|---|---|---|
| 4,803,592 | 2/1989 | Ashley | 361/79 |
| 5,691,870 | 11/1997 | Gebara | 361/86 |

*Primary Examiner*—Jeffrey Gaffin
*Assistant Examiner*—Michael J. Sherry

[57] ABSTRACT

A device and method for protecting a CPU from being broken down by overrating voltage or overrating current. The means for protecting the CPU are to detect the working voltage and working current provided to the CPU, to compare the working voltage and working current with the voltage and current settings, and to determine whether overrating voltage or/and overrating current is generated. If overrating voltage or/and overrating current occurs, a control signal is sent to the soft switch of an ATX power supply, a first switch, or a second switch in the device in order to cut the supplying route of the power supply. Therefore, the CPU is not broken down due to overrating voltage or/and overrating current. Detection means for detecting the breakdown of a switch-type stabilizing controller of the power supply to the CPU is also provided.

15 Claims, 3 Drawing Sheets

DEVICE AND METHOD FOR PROTECTING A CPU FROM BEING DAMAGED BY OVERRATING VOLTAGE OR OVERRATING CURRENT

FIELD OF THE INVENTION

This invention relates to a device and method for protecting a CPU from being damaged by overrating voltage or overrating current, particularly to a device and method which detect working voltage and working current from a power supply, compare the working voltage and working current with the voltage and current settings of a computer system, and control the supply of the power supply in order to prevent the CPU from being damaged by the overrating voltage and/or overrating current.

BACKGROUND OF THE INVENTION

Since the manufacture specifications of various CPUs, such as 80386, 80486, Pentium, Pentium Pro, Pentium II, Cyrix 200, 6X86, AMD K5, K6, etc. are not standardized, voltage switching means are disposed on the mother board by manufacturers all around the world in order to mount the CPUs of various specifications on the mother board. When the CPU is mounted, the voltage provided to the CPU is switched to a suitable voltage level by user. An early method is to use a jumper to change the voltage level provided to the CPU. However, this jumper method is troublesome and the CPU may be damaged because of wrong settings. Therefore, the mother board manufacturers endeavor to develop means for automatically setting a voltage, such as those disclosed in Taiwanese Patent Publication No. 304239 entitled "Method And Circuit For Automatically Setting A Power Supply Voltage Provided To A CPU Of A Personal Computer Mother Board". The circuit automatically switches the working voltage to a suitable level depending on the species of the CPU to be mounted so as to avoid the trouble and inconvenience of manual setting. No matter whether the jumper setting is used or the automatically switching circuit on the mother board is adopted, if the voltage of the power supply is not stable or the stabilizer on the mother board is run down, an overrating voltage or overcurrent is still generated and suitable protection means is not provided. Thus, the overrating voltage or overcurrent enters the CPU to break down the CPU.

SUMMARY OF THE INVENTION

It is an object of the present invention to provide a device and method for protecting the CPU from being damaged by an overrating voltage or overrating current. The means for protecting the CPU is to detect the working voltage and working current provided to the CPU, to compare the working voltage and working current with the voltage and current settings of the computer, and to determine whether overrating voltage or/and overrating current occurs. According to the invention, the computer has an ATX power supply. If the overrating voltage or/and overrating current occurs, a control signal is sent to the soft switch of the ATX power supply, or the control signal is sent to a switch in order to cut off the supply route of the power supply. Therefore, the CPU is protected from the overrating current voltage or/and overcurrent.

It is another object of the present invention to provide detection means for preventing the power supply of the CPU from sending out overrating voltage and/or overrating current because of any malfunction of the switch-type stabilizing controller. Therefore, overrating current or overrating voltage will not occur when the switch-type stabilizing controller malfunctions. The supply of the power to the CPU is stopped and the CPU can be protected.

BRIEF DESCRIPTIONS OF THE DRAWINGS

DETAILED DESCRIPTIONS OF THE INVENTION

The gist of the present invention is that the working voltage and working current between the power terminal Vcore and the switch-type stabilizing controller, which are provided to a CPU, are detected and received. The detected working voltage and working current are compared with the voltage setting and current setting on the computer system set by a user by means of the switch-type stabilizing controller. If overrating voltage or overrating current to the CPU is generated, the supply route of the power supply, i.e. the power from a power input, is cut off to stop supplying power to the CPU and to stop the operation of the CPU. In the present invention, three embodiments of the device and method for protecting the CPU from damage caused by the overrating current and/or overrating voltage are provided as described in the following examples.

EXAMPLE 1

Figure 1:
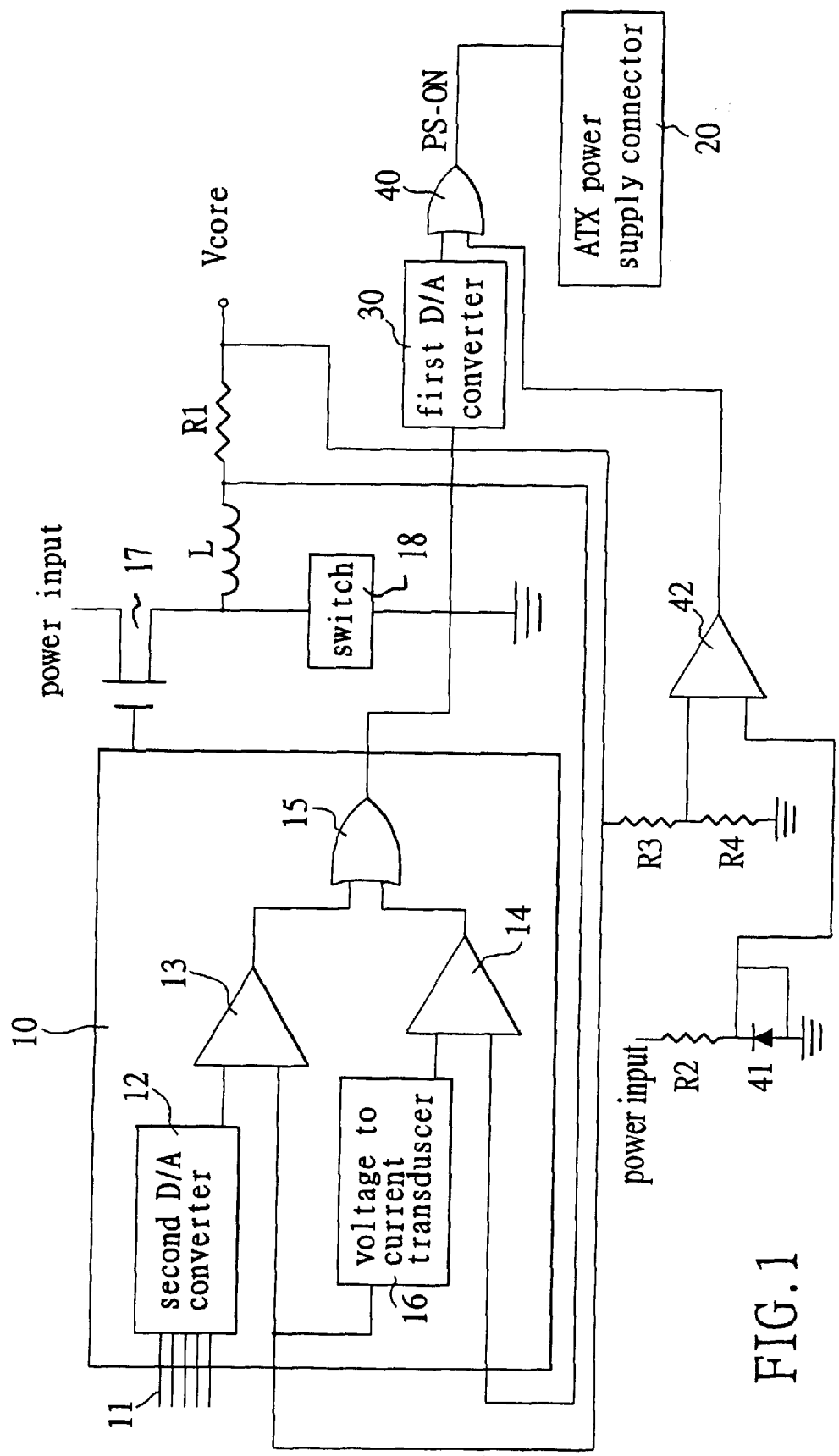
FIG. 1 is a schematic view of the circuit of the Example 1 of the present invention.

Please see FIG. 1. In this example, the means for protecting the CPU from being damaged by overrating voltage or overrating current is to control the soft switch PS_ON of the ATX power supply connector 20.

The device for protecting the CPU from being damaged by overrating voltage and overrating current comprises a switch-type stabilizing controller 10 for comparing the working voltage and working current with the voltage setting and current setting set on the system firmware (BIOS), an inductor L and a first resistor R1 connected in series. One terminal of the inductor L is connected to the power input via an FET 17 and to ground via a switch 18, and one terminal of the first resistor R1 is connected to the power terminal Vcore. A first D/A converter 30 is connected to the output of the switch-type stabilizing controller 10. The device uses a detection means for detecting the controller voltage and current from the switch-type stabilizing controller 10. A first OR gate 40 has one input connected to the first D/A converter 30 and the other input connected to the output of the detection means. An ATX power supply connector 20 is controlled by the output of the first OR gate.

The species of power supply of the CPU is set on the system firmware (BIOS) by a user, and the settings are transmitted to the switch-type stabilizing controller 10 via a bus 11. The switch-type stabilizing controller 10 comprises a second D/A converter 12 for converting the voltage settings set on the system firmware into analog voltage and current values that are used as the reference voltage of an overrating voltage comparator 13 and the reference current of an overrating current comparator 14 respectively. An OR gate 15 receives output signals from both overrating voltage and overrating current comparators 13, 14.

In the present invention, an inductor L and a first resistor R1 connected in series are disposed between the power input and the Vcore power supply of the CPU. The first node between the inductor L and the first resistor R1 is connected to one input of the overrating current comparator 14. The Vcore power terminal of the CPU is connected to the first transducer 16 in the switch-type stabilizing controller 10 for converting the voltage across the first resistor R1 into a current value to be transmitted to the overrating current comparator 14. The voltage across the resistor R1 is connected to the overrating voltage comparator 13. The output of the OR gate 15 is connected to a first D/A converter 30 for converting a digital signal into an analog signal to be transmitted to the input of the first OR gate 40.

If the signal provided to the soft switch PS_ON is at a low level, the ATX power supply is turned on to provide power. If the signal is at a high level, the ATX power supply is turned off. When the overrating voltage is generated or overrating current flows, the second OR gate 15 sends a high level voltage to the first D/A converter 30.

In order to prevent the power supply of the CPU from sending out overrating voltage or overrating current because of the malfunction of the switch-type stabilizing controller, the present invention provides a detection means which comprises (as shown in FIG. 1) a constant voltage output circuit and a detection comparator 42. The constant voltage output circuit comprises a second resistor R2 and a stabilizing component 41 connected in series to form a detection reference voltage as its output.

The detection comparator 42 compares the voltage of the power terminal Vcore with the detection reference voltage. The output of the detection comparator 42 is connected to the first OR gate 40. Third and fourth resistors R3, R4 are connected in series to form a voltage divider. One terminal of the third resistor R3 is connected to the power terminal Vcore and one terminal of the fourth resistor R4 is grounded. The node between the two resistors R3 and R4 is connected to an input of the detection comparator 42. In the present invention, the stabilizing component is preferably a Zener diode.

When the voltage of the power terminal Vcore which is provided to the CPU is in a normal range, the divider voltage at the node between resistors R3 and R4 is smaller than the detection reference voltage and the detection comparator 42 sends a low level voltage to the input of the first OR gate 40. If the switch-type stabilizing controller 10 is damaged and overrating voltage is sent to the CPU, the divider voltage at the node between resistors R3 and R4 becomes higher than the detection reference voltage. Under this circumstance, the detection comparator 42 sends a high voltage to the first OR gate 40.

The output of the first OR gate 40 is used to control the soft switch PS_ON of the ATX power supply connector 20. The function of the first OR gate 40 is to stop the supply of the power by sending the high level voltage generated to the soft switch PS_ON of the ATX power supply connector 20 when overrating voltage or overrating current is generated during the normal operation of the switch-type stabilizing controller 10 or when overrating voltage or overrating current is generated due to the breakdown of the switch-type stabilizing controller 10. On the contrary, if the voltage and current are normal, the first OR gate 40 sends a low level voltage to retain the normal power supplying of the ATX power supply.

In summary, the method of protecting a CPU from being damaged by overrating voltage or overrating current is accomplished by comparing the working voltage and working current of the power supply with the voltage and current settings. If overrating voltage or overrating current occurs, a control signal is sent out to control the soft switch of the power supply and to turn off the power supply.

EXAMPLE 2

Figure 2:
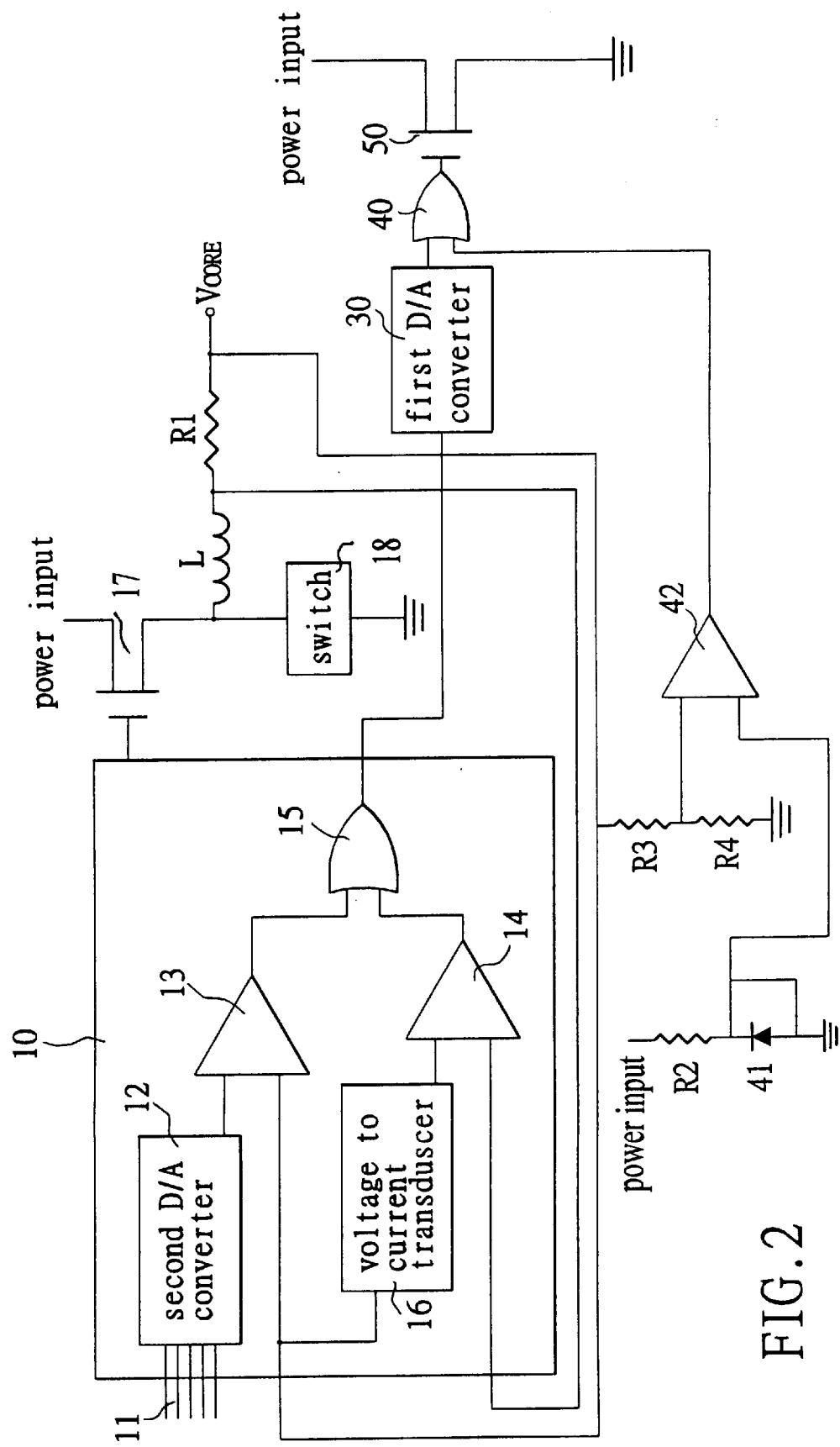
FIG. 2 is a schematic view of the circuit of the Example 2 of the present invention.

Please see FIG. 2. This example utilizes the self-protection property of the power supply. The power supply is forcibly grounded so that the power supply is not damaged and the Vcore power is not provided to the CPU when the overrating voltage or overrating current occurs. The circuit of Example 2 is similar to that of the Example 1 except that the output of the first OR gate 40 is connected to the first switch 50 (the first switch can be a MOS transistor, a bipolar transistor, a SCR or any other electrical components which can be used as a switch). When the overrating voltage or overrating current is generated, the high level voltage sent from the first OR gate 40 turns on the first switch 50 to let the power input of the power supply be forcibly grounded. The method of protecting the CPU from being damaged of Example 2 is the same as that of Example 1 except that the step of turning off the power supply is done by forcibly grounding the power supply to stop providing power to the CPU.

EXAMPLE 3

Figure 3:
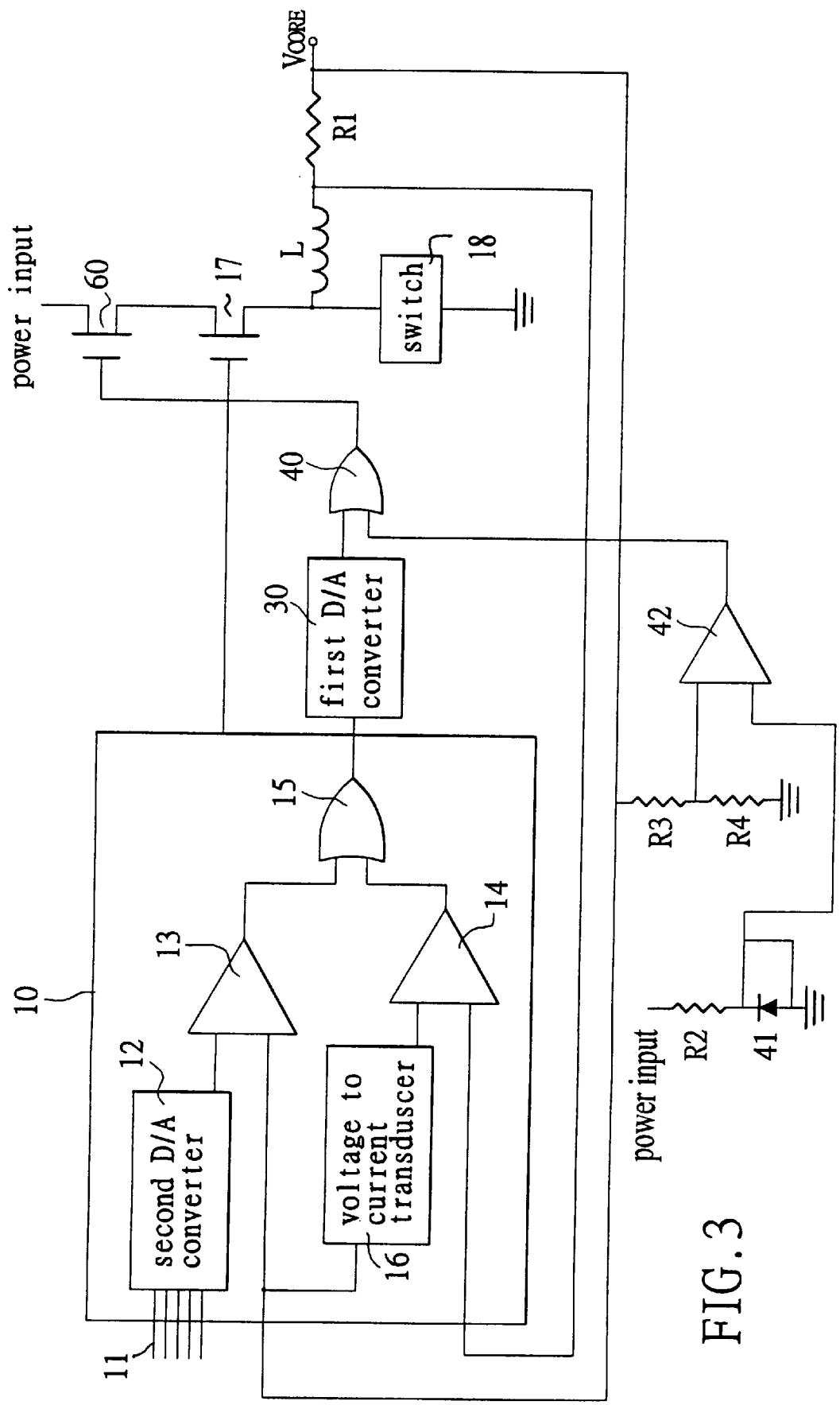
FIG. 3 is a schematic view of the circuit of the Example 3 of the present invention.

Please see FIG. 3. The means for stopping the supply of the power in this example is to dispose a second switch 60 (the second switch can be a MOS transistor, a bipolar transistor, or any other electrical components which can be used as a switch) between the Vcore power terminal of CPU and the power input (power supply). The route of supplying the Vcore power is cut off by means of the control of the on/off switching of the second switch 60. The circuit of this example is the same as that of the Example 1 except that the output of the first OR gate 40 is connected to the second switch 60. When overrating voltage or overrating current is generated, the second switch 60 exhibits an open loop state in order to cut the route of the supplying power of Vcore, i.e. to cut the supplying route of power supply. Then, no electrical power is provided to the CPU for operation. The method of Example 3 is the same as that of Example 1 except that the step of turning off the power supply is done by turning off the second switch to form an open loop to stop providing power to the CPU.

While the invention has been particularly shown and described with reference to these preferred embodiments, it will be understood by those skilled in the art that various changes in form and details may be made without departing from the spirit and scope of the invention. Although only the preferred embodiments of this invention were shown and described in the above description, it is requested that any modification or combination that comes within the spirit of this invention be protected.

We claim:

1. A device for protecting a CPU from being damaged by overrating voltage or overrating current, said device detecting a working voltage and a working current of a power supply supplied to the CPU and turning off the power supply if the overrating voltage or overrating current occurs, wherein said device comprises:

a switch-type stabilizing controller for comparing the working voltage and the working current with a voltage setting and a current setting set on a computer system;

an inductor and a first resistor connected in series in which a first terminal of the inductor is connected to the power supply and a first terminal of the first resistor is connected to a power terminal;

a first D/A converter to which an output of the switch-type stabilizing controller is connected;

a detection means for detecting a controller voltage and a controller current from the switch-type stabilizing controller;

a first OR gate in which one input of the first OR gate is connected to the first D/A converter and the other input of the first OR gate is connected to an output of the detection means; and an ATX power supply connector to which an output of the first OR gate is connected;

wherein when the overrating voltage occurs or overrating current flows through the CPU, the output of the switch-type stabilizing controller sends a first level voltage to the first D/A converter, the output of the first OR gate is at the first level voltage, and the CPU power supply is turned off.

2. The device for protecting a CPU from being damaged by overrating voltage or overrating current as claimed in claim 1, wherein the switch-type stabilizing controller comprises:

a second D/A converter by which the voltage setting set on the computer system is converted into analog voltage and current values to be used as a reference voltage of an overrating voltage comparator and as a reference current of an overrating current comparator respectively;

a second OR gate;

an overrating voltage comparator having an input connected to the output of the second D/A converter and sending a signal to the second OR gate when the detected working voltage is beyond the voltage setting;

a first transducer for converting the voltage across the first resistor into a current signal; and an overrating current comparator having an input connected to the first transducer and sending a signal to the second OR gate when the detected working current is beyond the current setting.

3. The device for protecting a CPU from being damaged by overrating voltage or overrating current as claimed in claim 1, wherein the detection means comprises:

a constant voltage output circuit having a second resistor and a stabilizing component connected in series and forming a detection reference voltage as an output;

a detection comparator which compares the working voltage of the power supply with the detection reference voltage, the output of the detection comparator being connected to the first OR gate; and third and fourth resistors connected in series to form a voltage divider in which a first terminal of the third resistor is connected to a power terminal, a first terminal of the fourth resistor is grounded and the node between the third and fourth resistors is connected to an input of the detection comparator.

4. The device for protecting a CPU from being damaged by overrating voltage or overrating current as claimed in claim 3, wherein the stabilizing component is a Zener diode.

5. A device for protecting a CPU from being damaged by overrating voltage or overrating current, said device detecting a working voltage and a working current of a power supply supplied to the CPU and turning off the power supply if the overrating voltage or overrating current occurs, wherein said device comprises:

a switch-type stabilizing controller for comparing the working voltage and the working current with a voltage setting and a current setting set on a computer system;

an inductor and a first resistor connected in series in which a first terminal of the inductor is connected to the power supply and a first terminal of the first resistor is connected to a power terminal;

a first D/A converter to which an output of the switch-type stabilizing controller is connected;

a detection means for detecting a controller voltage and a controller current from the switch-type stabilizing controller;

a first OR gate in which one input of the first OR gate is connected to the first D/A converter and the other input of the first OR gate is connected to an output of the detection means; and a first switch to which an output of the first OR gate is connected;

wherein when the overrating voltage occurs or overrating current flows through the CPU, the output of the switch-type stabilizing controller sends a first level voltage to the first D/A converter, the output of the first OR gate is at the first level voltage, and the CPU power supply is turned off.

6. The device for protecting a CPU from being damaged by overrating voltage or overrating current as claimed in claim 5, wherein the switch-type stabilizing controller comprises:

a second D/A converter by which the voltage setting set on the computer system is converted into analog voltage and current values to be used as a reference voltage of an overrating voltage comparator and as a reference voltage of an overrating current comparator respectively;

a second OR gate;

an overrating voltage comparator having an input connected to the output of the second D/A converter and sending a signal to the second OR gate when the detected working voltage is beyond the voltage setting;

a first transducer for converting the voltage across the first resistor into a current signal; and an overrating current comparator having an input connected to the first transducer and sending a signal to the second OR gate when the detected working current is beyond the current setting.

7. The device for protecting a CPU from being damaged by overrating voltage or overrating current as claimed in claim 5, wherein the detection means comprises:

a constant voltage output circuit having a second resistor and a stabilizing component connected in series and forming a detection reference voltage as an output;

a detection comparator which compares the working voltage of the power supply with the detection reference voltage, the output of the detection comparator being connected to the first OR gate; and third and fourth resistors connected in series to form a voltage divider in which a first terminal of the third resistor is connected to a power terminal and a first terminal of the fourth resistor is grounded and the node between the third and fourth resistors is connected to an input of the detection comparator.

8. The device for protecting a CPU from being damaged by overrating voltage or overrating current as claimed in claim 5, wherein the first switch is a MOS transistor.

9. The device for protecting a CPU from being damaged by overrating voltage or overrating current as claimed in claim 5, wherein the first switch is a silicon controlled rectifier (SCR).

10. The device for protecting a CPU from being damaged by overrating voltage or overrating current as claimed in claim 5, wherein the first switch is a bipolar transistor.

11. A device for protecting a CPU from being damaged by overrating voltage or overrating current, said device detecting a working voltage and a working current of a power supply supplied to the CPU and turning off the power supply if the overrating voltage or overrating current occurs, wherein said device comprises:

a switch-type stabilizing controller for comparing the working voltage and the working current with a voltage setting and a current setting set on a computer system;

an inductor and a first resistor connected in series in which a first terminal of the inductor is connected to the power supply and a first terminal of the first resistor is connected to a power terminal;

a first D/A converter to which an output of the switch-type stabilizing controller is connected;

a detection means for detecting a controller voltage and a controller current from the switch-type stabilizing controller;

a first OR gate in which one input of the first OR gate is connected to the first D/A converter and the other input of the first OR gate is connected to an output of the detection means; and a second switch being disposed between the power supply and the inductor and connected to the output of the first OR gate;

wherein when the overrating voltage occurs or overrating current flows through the CPU, the output of the switch-type stabilizing controller sends a first level voltage to the first D/A converter, the output of the first OR gate is at the first level voltage, and the CPU power supply is turned off.

12. The device for protecting a CPU from being damaged by an overrating voltage or overrating current as claimed in claim 11, wherein the switch-type stabilizing controller comprises:

a second D/A converter by which the voltage setting set on the computer system is converted into analog voltage and current values to be used as a reference voltage of an overrating voltage comparator and as a reference voltage of an overrating current comparator respectively;

a second OR gate;

an overrating voltage comparator having an input of which is connected to the output of the second D/A converter and sending a signal to the second OR gate when the detected working voltage is beyond the voltage setting;

a first transducer for converting the voltage across the first resistor into a current signal; and an overrating current comparator having an input connected to the first transducer and sending a signal to the second OR gate when the detected working current is beyond the current setting.

13. The device for protecting a CPU from being damaged by overrating voltage or overrating current as claimed in claim 11, wherein the detection means comprises:

a constant voltage output circuit having a second resistor and a stabilizing component connected in series and forming a detection reference voltage as an output;

a detection comparator which compares the working voltage of the power supply with the detection reference voltage, the output of the detection comparator being connected to the first OR gate; and third and fourth resistors connected in series to form a voltage divider in which a first terminal of the third resistor is connected to a power terminal and a first terminal of the fourth resistor is grounded and the node between the third and fourth resistors is connected to an input of the detection comparator.

14. The device for protecting a CPU from being damaged by overrating voltage or overrating current as claimed in claim 11, wherein the second switch is a MOS transistor.

15. The device for protecting a CPU from being damaged by overrating voltage or overrating current as claimed in claim 11, wherein the second switch is a bipolar transistor.

* * * * *